July 15, 1924.   1,501,292
S. SMITH
EGG TURNING DEVICE
Filed June 10, 1922
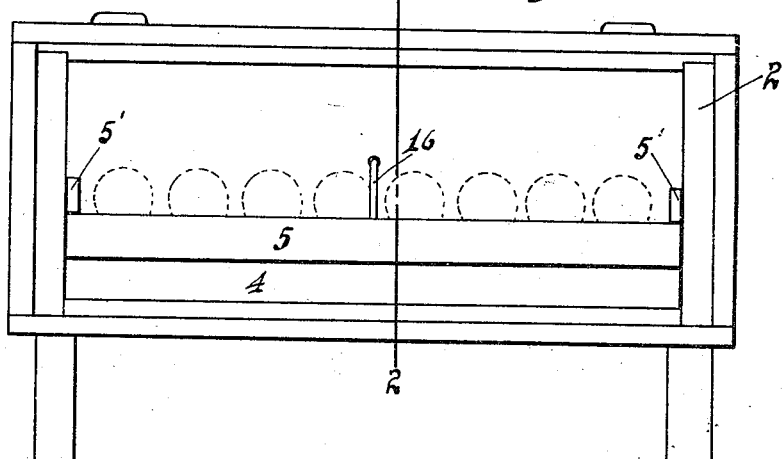
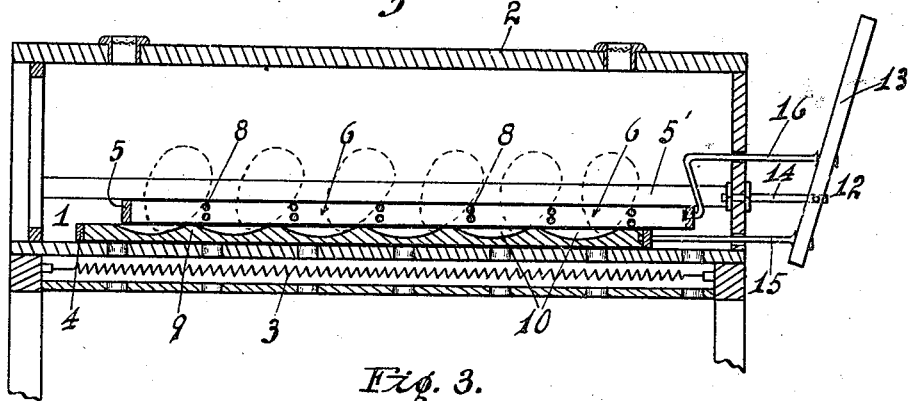
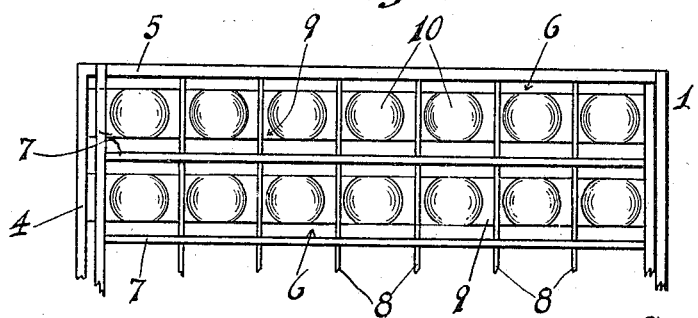
Inventor.
Seward Smith.
By
Harry C. Schroeder
Attorney.

Patented July 15, 1924.

1,501,292

UNITED STATES PATENT OFFICE.

SEWARD SMITH, OF OAKLAND, CALIFORNIA.

EGG-TURNING DEVICE.

Application filed June 10, 1922. Serial No. 567,278.

*To all whom it may concern:*

Be it known that I, SEWARD SMITH, a citizen of the United States, residing at Oakland, in the county of Alameda and State of California, have invented certain new and useful Improvements in Egg-Turning Devices, of which the following is a specification.

My invention is an improved egg turning device. The common methods of turning the eggs in an incubator are to turn them by hand or by tipping the trays containing the eggs. Either method involves the opening and consequent cooling of the incubator.

My egg turner is operated from the outside of the incubator and is very simple in construction and inexpensive to manufacture.

Referring to the drawing which forms a part of this specification:

Figure 1 is an end view of an incubator with the end removed to show my egg turner in position.

Figure 2 is a sectional view taken on the line 2—2 of Figure 1.

Figure 3 is a fragmentary plan view of my egg turning device.

Referring more particularly to the drawing, the numeral 1 indicates my egg turning device which is placed in the bottom of an incubator 2. A suitable heating means such as the resistance coil 3 furnishes the required heat for the incubator.

My egg turning device 1 comprises a tray 4 and a frame 5, the frame 5 resting upon the tray 4. Guides 5' are secured to the sides of the incubator 2 to hold the frame 5 in position. The tray 4 is divided into a plurality of egg compartments 6 by longitudinal strips 7 and transverse wires 8. The tray 4 has a plurality of strips 9 which extend longitudinally under the egg compartments 6 of the frame 5. The strips 9 have depressions 10 corresponding to each of the compartments 6, the purpose of which will be described later.

A shifting device 12 is provided at the rear of the incubator 2. The shifter 12 comprises a lever 13 pivoted to a post 14 which is secured to the back wall of the incubator 2. An arm 15 is secured to the shaft lever 13 below the post 14 and extends through the incubator wall and is fastened to the tray 4. An arm 16 is secured to the lever 13 above the post 14 and extends through the incubator wall and is fastened to the frame 5.

The operation of my invention is as follows: The eggs are placed in the compartments 6 with the points resting in the depressions 10. To turn the eggs the lever 13 is moved inwardly (see Fig. 2) which moves the arm 16 and frame 5 inwardly and the arm 15 and tray 4 outwardly. This movement causes the eggs to tip as desired.

If a standard form of incubator is used, the control means for my egg turner may be placed inside of the incubator.

Having described my invention, I claim:

1. In combination with an incubator, an egg turning device comprising a tray, a frame superimposed on said tray, egg compartments in said frame, depressions in the tray below said egg compartments, a lever pivoted to the incubator, a link secured to said frame and to said lever, and a link secured to said tray and to said lever.

2. In combination with an incubator, an egg turning device comprising a tray, a frame superimposed on said tray, egg compartments in said frame, depressions in said tray below said egg compartments, and means for moving said frame and tray members simultaneously in opposite directions.

In testimony whereof I affix my signature.

SEWARD SMITH.